US006453847B2

(12) United States Patent
Brooks

(10) Patent No.: US 6,453,847 B2
(45) Date of Patent: Sep. 24, 2002

(54) ELECTRO-MAGNETICALLY CONTROLLED PET DOOR

(75) Inventor: Steve Martin Brooks, Pyrford (GB)

(73) Assignee: Pet Mate Limited, Surrey (GB)

( * ) Notice: Subject to any disclaimer, the term of this patent is extended or adjusted under 35 U.S.C. 154(b) by 0 days.

(21) Appl. No.: 09/844,115

(22) Filed: Apr. 27, 2001

(30) Foreign Application Priority Data

Apr. 28, 2000 (GB) ............................................ 0010434

(51) Int. Cl.[7] .............................. A01K 1/00; E06B 3/00

(52) U.S. Cl. ..................... 119/484; 340/547; 340/573.1

(58) Field of Search ............................ 119/484, 51.02, 119/62, 163; 340/540, 545.1, 545.2, 547, 573.1; 49/13

(56) References Cited

U.S. PATENT DOCUMENTS

| | | | | | |
|---|---|---|---|---|---|
| 2,153,673 | A | * | 4/1939 | Nidever | 119/495 |
| 4,022,263 | A | | 5/1977 | Beckett et al. | |
| 4,216,743 | A | | 8/1980 | Cohen | |
| 4,322,913 | A | * | 4/1982 | Himmer | 49/168 |
| 4,399,771 | A | * | 8/1983 | Medley | 119/501 |
| 4,697,383 | A | * | 10/1987 | Hagiwara | 49/25 |
| 5,177,900 | A | * | 1/1993 | Solowiej | 49/25 |
| 5,813,364 | A | * | 9/1998 | Harrison | 119/501 |

FOREIGN PATENT DOCUMENTS

| | | |
|---|---|---|
| GB | 1567001 | 5/1980 |
| GB | 1588673 | 4/1981 |
| GB | 2119431 | 11/1983 |
| GB | 2223257 | 4/1990 |

* cited by examiner

*Primary Examiner*—Yvonne R. Abbott
(74) *Attorney, Agent, or Firm*—Dilworth & Barrese, LLP

(57) ABSTRACT

An electro-magnetically controlled pet door having a door (1) pivotally mounted in a door aperture (17) of a frame (2) and an electrically controlled catch mechanism normally preventing opening of the door in at least one direction that is released when a magnet (30) carried by an animal approaching the door is sensed by two or more reed switches (23,24) on or in the frame mounted and connected electrically in parallel. The switches (23,24) are disposed in an array extending circumferentially of said door aperture and have normally open contacts and magnetic biasing means (26,27) are associated with the reed switches and positioned laterally thereof to increase their sensitivity.

10 Claims, 5 Drawing Sheets

ELECTRO-MAGNETICALLY CONTROLLED PET DOOR

This invention relates to an improved electro-magnetically controlled pet door. However, the term "pet door" will be used hereafter and is intended to refer to an entrance designed for animals such as domestic cats or small dogs.

Pet doors are frequently fitted to houses to allow the pet to enter and leave of its own free will. A pet door of this type would typically have a door pivotally mounted in a frame, the door being of a size such that the pet can readily push it open with its nose or paw. The opened door is returned to its closed position by gravity or by means of a small spring to eliminate unwanted draughts after the animal has passed through.

One draw-back of pet doors of this type which concerns pet owners is that stray pets will often try to enter the house. In order to prevent this problem, "selective" pet doors have been designed which ensure that the door into the house is locked by a latch which is rendered inoperative in response to an "operator" carried by the pet.

Various prior art solutions have been proposed but none of them has been found to be particularly satisfactory. UK patent No. 1567001 uses a magnetic responder linked to a latch member that is attracted towards an operator made of soft iron or to a bar magnet attached to the pets collar. The principle draw-back of this arrangement is that the operator is heavy and highly magnetic (thus attracting unwanted metallic objects) and the latch member has a very high inertia and will therefore not always respond quickly enough to the magnet attached to the cat as it passes over the magnetic responder. Thus, the pet may not have deactivated the latch by the time it presses the door against the latch. This patent also proposes another design which uses an inductance loop extending around the opening in conjunction with a control circuit to detect change in inductance. However, the major problem with this design is the high cost of production and also it is possible that the system could be incorrectly triggered by a pet wearing a steel address-carrying barrel or even a buckle on a collar.

UK patent No. 1588673 discloses a design using a magnetically operable switch in conjunction with adjustable biasing means located directly opposite the switch. Although this design makes it possible to render a single reed switch sufficiently sensitive to allow for the deficiencies of using a single unbiased switch, in practice it demands relatively expensive circuitry to create a time delay and then energise a resetting coil positioned around the reed switch in order to reopen the reed switch, which could otherwise remain closed under the influence of the biasing magnet. A further problem with this arrangement is that the adjustable biasing needs adjustment in situ to compensate for local magnetic effects which can be awkward and is certainly an undesirable task for the pet owner to perform.

A further prior art proposal is disclosed in U.S. Pat No. 4022263 in which the problem of encouraging the pet to enter the door centrally and thus come into sufficient proximity to a single unbiased magnetically operable switch is achieved by mounting the switch on an external door taking the form of a flexible iris positioned in front of an interior swing door. This design is extremely expensive to manufacture largely as a result of its two door construction. A further disadvantage is that the unit is fairly bulky which makes it unsuitable for installation in a domestic door.

The Applicant improved upon the aforementioned prior art devices and developed the design disclosed in their UK patent No. 2.223.257. This provides an electromagnetically controlled pet door comprising a door pivotally mounted in a door aperture of a frame and an electrically controlled catch mechanism normally preventing opening of the door in at least one direction that is released when a magnet carried by an animal approaching the door is sensed by a sensor which comprises two or more reed switches on or in the frame connected electrically in parallel, the switches being disposed in an array extending circumferentially of said door aperture. Whilst this design represented a substantial improvement over the pet doors of the prior art referred to above, it was found that the pet door would not always work satisfactorily with larger animals because the magnet around their neck was further away from its nose used to open the door and it would therefore sometimes be out of the operating range of the reed switches. One way of solving is problem would be to increase the size of the magnet around the animals neck but this was not acceptable as the heavier magnet would then be uncomfortable for the animal to wear and would attract unwanted metallic objects.

It is an object of the present invention therefore to provide a pet door in which the sensitivity of the reed switches is increased without the need for increasing the size of the magnet around the animals neck.

According to the present invention there is provided an electro-magnetically controlled pet door comprising a door pivotally mounted in a door aperture in a frame, an electrically controlled catch mechanism normally preventing opening of the door in at least one direction that is released when the presence of a magnet carried by an animal approaching the door is sensed by a sensor comprising two or more reed switches on or in the frame connected electrically in parallel, said switches being disposed in an array extending circumferentially of said door aperture and having normally open contacts, the contacts of one or more of the switches closing in the presence of a magnet carried by an animal, wherein the pet door also includes magnetic field producing biasing means operable to increase the sensitivity of the reed switches to an animal borne magnet, said magnetic field producing biasing means comprises first and second magnets located beyond respective ends of the sensor and displaced transversely therefrom so as to produce a flux path extending along said sensor between the pole of the first magnet and the pole of the other magnet facing the sensor so that the contacts automatically open again when the presence of the magnet carried by the animal is no longer sensed by the reed switches.

According to a further aspect of the invention, there is provided an electro-magnetically controlled pet door comprising a door frame with an aperture therein, a door pivotally mounted in said door aperture, a sensor comprising a plurality of parallel-connected reed switches having normally open contacts and arranged endto-end transversely of said frame such that at least one reed switch will close in the presence of a magnet carried by an animal approaching the door for passage therethrough, magnetic field producing biasing means for increasing the sensitivity of said sensor to an animal-borne magnet, and an electrically controlled catch mechanism normally preventing opening of the door in at least one direction and released by the closing of any of said reed switches, wherein the biasing means comprises first and second magnets located beyond respective ends of the sensor and displaced transversely therefrom so as to produce a flux path extending along said sensor between the pole of the first magnet and the pole of the other magnet facing the sensor.

Preferably the magnetic biasing means comprise a pair of magnets each positioned closely adjacent one of said reed switches., the ends of the magnets facing the reed switches being of opposite polarity.

Alternatively, the sensor can comprise three reed switches which are generally axially aligned to provide a central reed switch between two end switches, the magnetic biasing means comprising a pair of magnets each of which is positioned closely adjacent one of said end switches, the ends of the magnets facing the reed switches being of opposite polarity.

Preferably the reed switches are disposed in the frame coaxially with their common axis parallel with the plane of said aperture and spaced therefrom oppositely to said one direction, the main axis of the biasing magnets being at 9° to the common axis of the reed switches.

In the preferred embodiment, the reed switches are positioned in an outward extension of the lower surface of the frame in which the door pivots.

In the preferred embodiment, the reed switches are mounted on a platform which forms part of a chassis on which the catch mechanism is mounted, said platform extending within said outward extension of the lower surface of the frame in which the door pivots. Conveniently the reed switches are mounted at the front of said platform and they are axially aligned.

Preferred embodiments of the invention will now be described, by way of example only, with reference to the accompanying drawings, in which.

Figure 1:
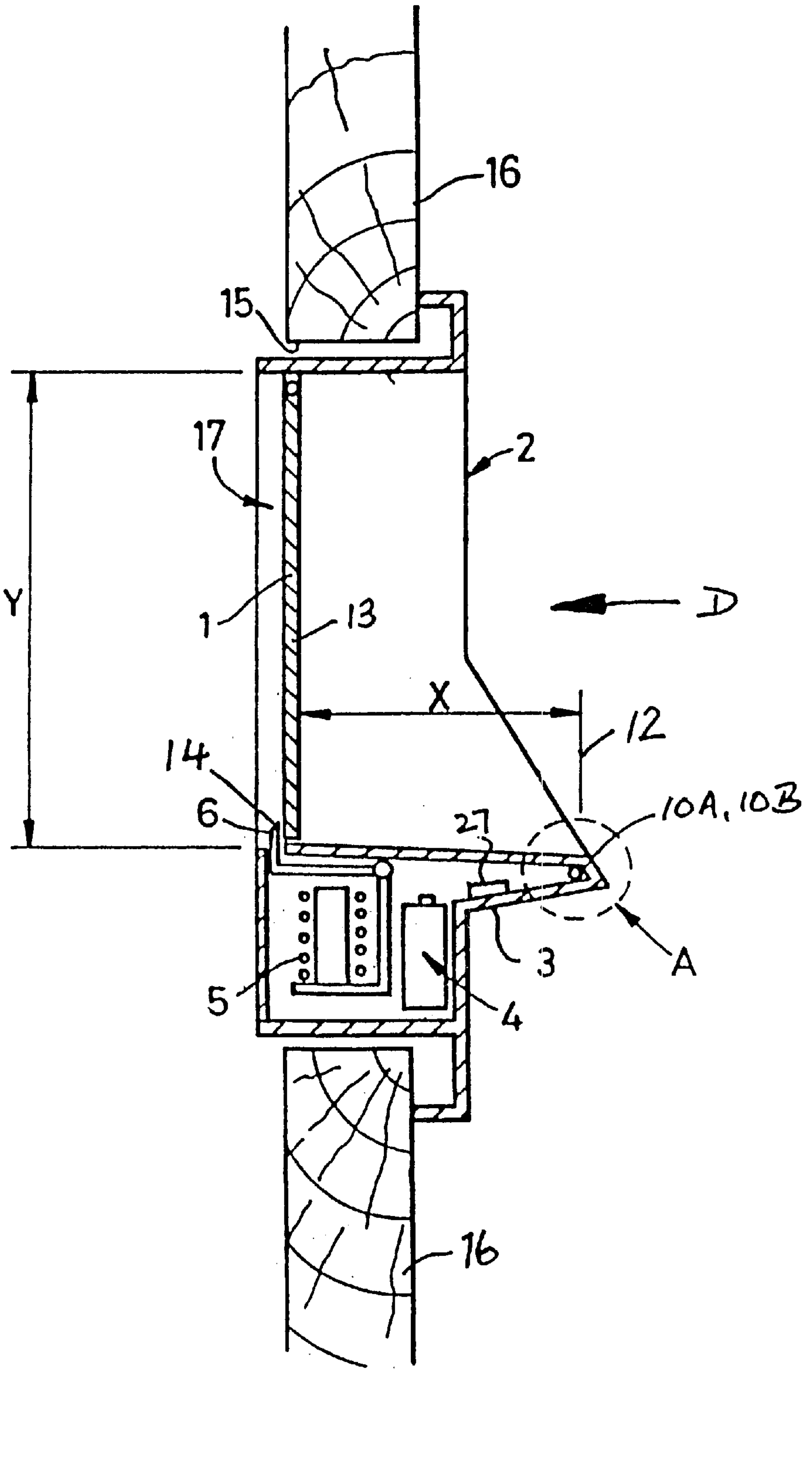
FIG. 1 is a sectional elevation of an electro-magnetically controlled pet door installed in a house door.

Referring to FIG. 1, there is shown a door 1 which is pivoted at its upper edge within a frame 2 fitted within an aperture 15 in a door 16. The frame 2 defines a generally rectangular aperture 17 which is closed by the door 1 when the latter hangs upright as shown in FIG. 1. Two normally open reed switches 10A and 10B of, for example, approximately 10 Ampere turns sensitivity are mounted coaxially in the distal edge of an extension 3 of the lower surface of the frame 2 (see FIG. 2), their common axis 12 being parallel with but spaced outwardly of the plane of the aperture 17. The reed switches 10A and 10B are connected electrically in parallel as shown in FIG. 3 with a power source 4 and a solenoid 5 that disengages a door catch 6 when energised by connecting the reed switches in this way, a common detection zone is provided with extends across the desired width of the frame 2. To achieve this common detection zone, the centres of the reed switches 10A and 10B need to be spaced apart by approximately 3.0 cm depending on the particular reed switch characteristics. This construction ensures that the detection zones of the individual reed switches overlap, as illustrated, sufficiently to provide an almost cylindrical detection zone of approximate radius of 2.5 cm which extends approximately 2.5 cm at each end beyond the centre points of the outer most reed switches and along an axis defined by the common longitudinal axis of the reed switches. The detection zone is indicated by the line A in FIGS. 1 and 3.

Figure 6:
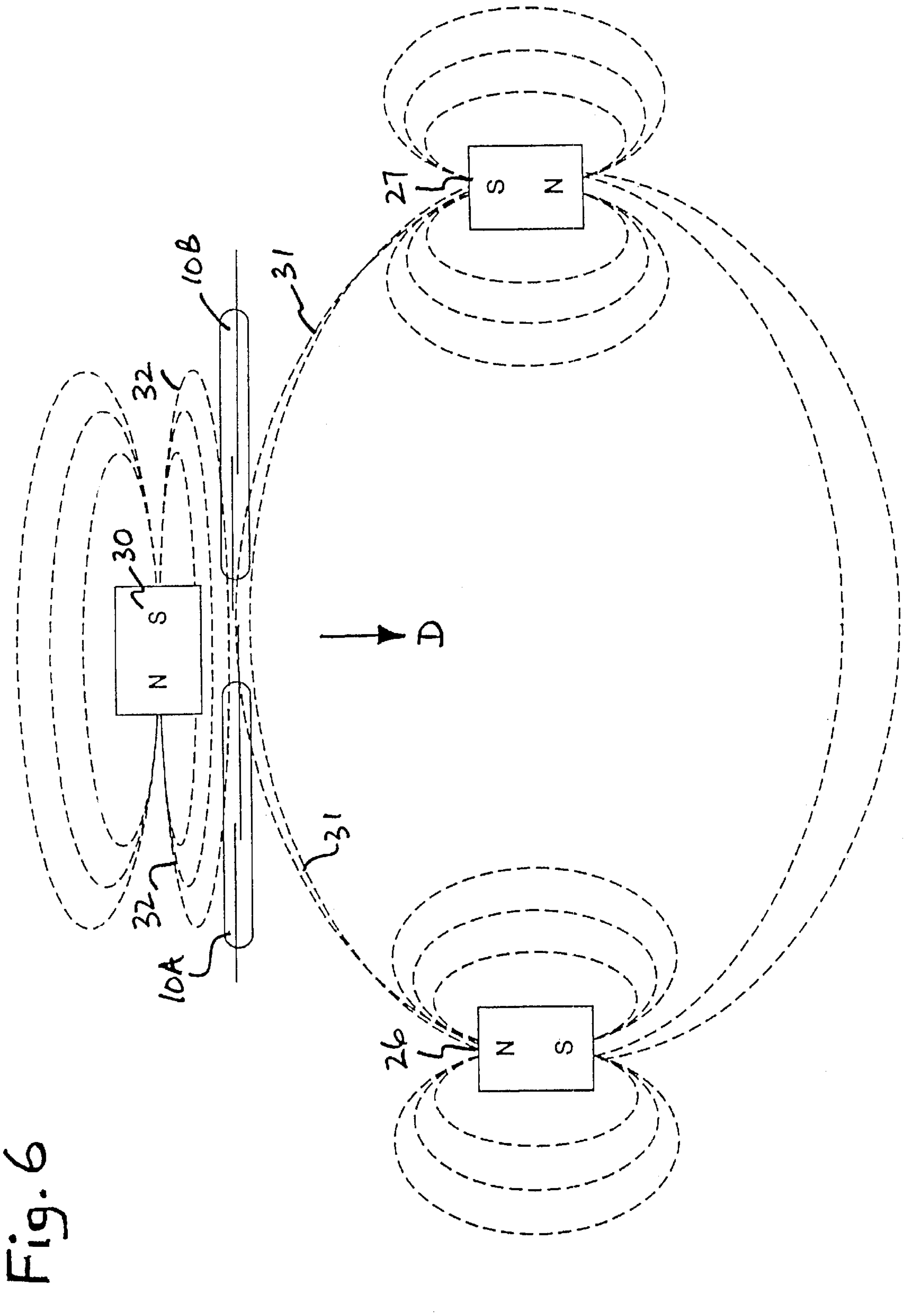
FIG. 6 is a schematic diagram showing the magnetic fields generated by the magnet carried by a pet (not shown) and the biasing magnets of the pet door shown in FIGS. 1 and 2.

When a magnet 30 preferably oriented as shown in FIG. 6 carried on the collar of a pet approaching the door 1 from the right as viewed in FIG. 1 enters this zone A, at least one of the switches 10A,10B will close causing the solenoid 5 to be energised. This in turn releases the catch 6 so the door can now be pushed open, swinging to the left as viewed in FIG. 1 as the pet continues through the aperture 17.

In practice, this situation is easily achieved in mass manufacture by careful selection of two critical dimensions of the cat door structure in order to suit the anticipated size range of pets likely to use the door. Firstly, the height of the door Y should be kept to a minimum to ensure that a small magnet attached to the animals collar is forced to move into the detection zone A. Secondly, the horizontal distance X from the exterior surface 13 of the pet door to the centre line 12 of the reed switches 10A,10B should be set to correspond to a dimension similar to the horizontal distance from the pets nose to the position in which the magnet normally hangs around its neck as pets normally push the door open with their nose. In practice, for most pets, a dimension Y of approximately 15 cm has found to be suitable and no adjustment would normally be necessary outside this guideline. If necessary, it would be possible to hang the magnet on the pet collar a little lower. Similarly, the preferred dimension for X is approximately 10 cm. This latter value of X is based on the largest pets likely to use the door because, once one of the reed switches 10A,10B has been closed, hysteresis effects will keep the switch closed until the magnet is some 4 cm away from the switch depending on the characteristics of the particular reed switches 10A,10B and the operating magnet used.

In this way, the latch 6 remain deactivated sufficiently for a small pet or kitten to push the door 1 open with its nose before the latch is reactivated.

The door catch 6 is lightly spring loaded so as to normally prevent entry into the house. However, after the animal has passed through the door to the inside of the house, an angled face 14 of the catch 6 is struck by the returning door 1 and depressed momentarily thus engaging the catch again. In the arrangement shown, it is not necessary for the catch 6 to be released when the pet pushes the door 1 open to exit the house, i.e. when moving through the frame aperture 17 from left to right as viewed in FIG. 1. Closure of one or more of the reed switches 10A, 10B at this time will not matter. By the time the full length of the pet has passed through the aperture, its magnet will no longer be in the zone A.

Figure 4:
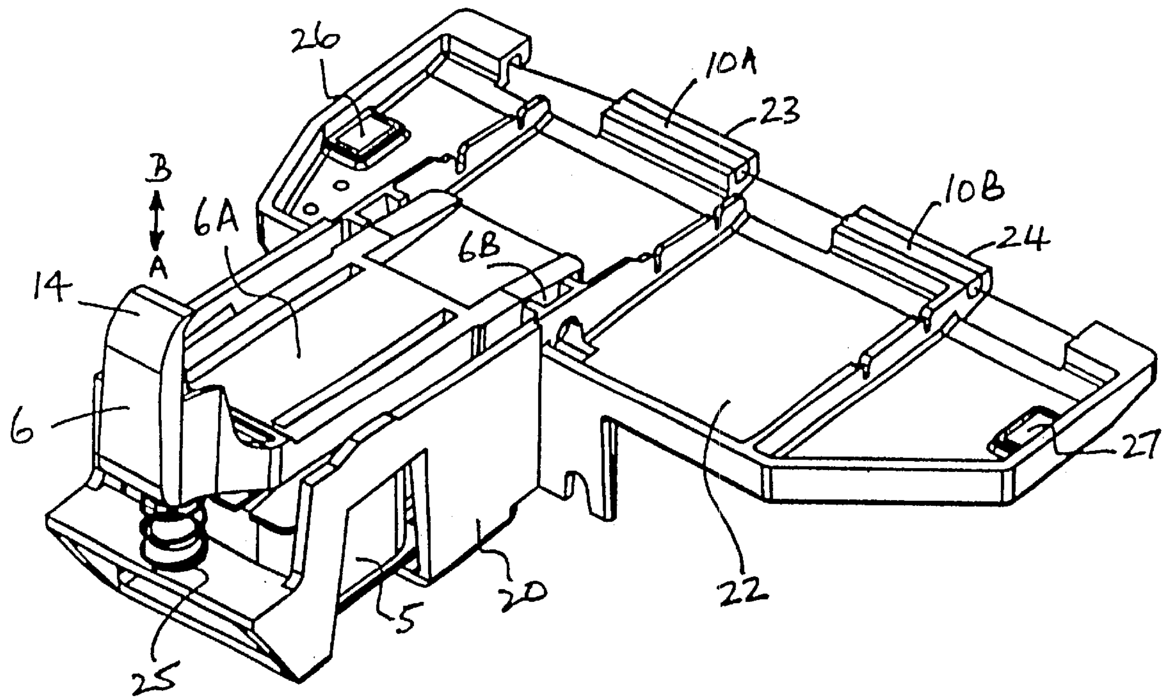
FIG. 4 is a perspective view of a chassis or support member having two reed switches thereon for use in the pet door shown in FIGS. 1 or 2.
Figure 5:
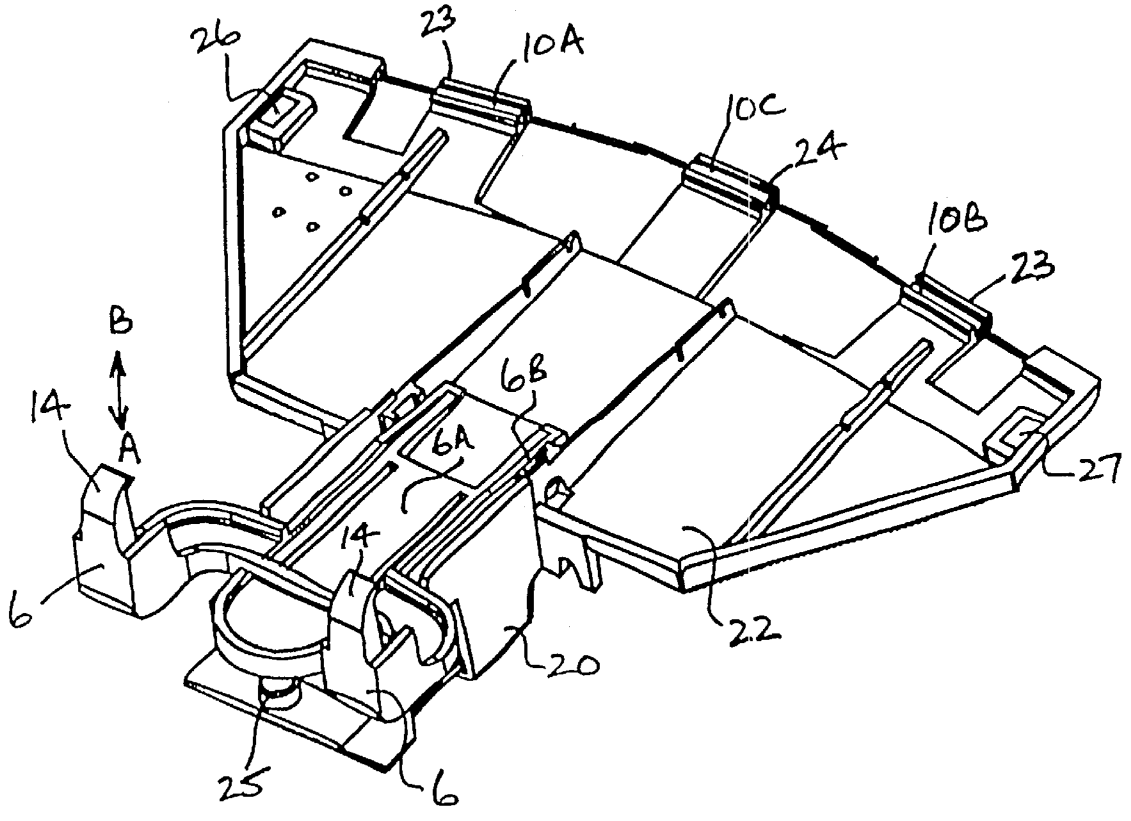
FIG. 5 is a perspective view of a chassis or support member having three reed switches thereon for use in the pet door shown in FIGS. 1 and 2.

Referring now to FIGS. 4 and 5, there is shown an assembly which incorporates biasing magnets 26 and 27 to improve the sensitivity of the reed switches 10A and 10B. The biasing magnets 26 and 27 are positioned beyond the respective ends of the switches 10A,10B and transversely thereto so that they produce a flux path which extends along the switches 10A,10B between the pole of the first magnet 26 and the pole of the second magnet 27 which faces the switches 10A,10B. In the arrangement shown in FIG. 4, the catch 6 is provided at the end of an arm 6A whose other end is pivotally mounted at 6B in a chassis 20. A solenoid 5 is also mounted in the chassis 20 which when activated moves the catch 6A up or down in the direction of the arrow A–B. When the solenoid 5 is actuated, the arm 6A will move downwardly against the action of spring 25 in the direction of arrow A whereas when it is deactivated, the catch 6 will move upwardly in the direction of arrow B under the action of the spring 25.

The operation of the solenoid 5 is governed by the reed switches 10A and 10B which are mounted along the front edge of a platform 22 extending forwardly from the chassis 20. The two normally open reed switches 10A,10B have a sensitivity of, for example, approximately 10 Ampere turns and the contacts of the switches are normally open. However, to increase the sensitivity of the reed switches 10A,10B, the biasing magnets 26 and 27 of opposite polarity are mounted on the platform 22 transversely of the switches 10A,10B so as to produce a flux path extending along the switches 10A,10B between the pole of the first magnet 26 and the pole of the other magnet 27 facing the switches thereby increasing the sensitivity of said switches. The exact mounting location of the magnets 26,27 on the platform 20 will depend on the level of sensitivity required for the reed switches 10A, 10B. Preferably, the magnets are glued in position in the desired location for the chosen level of sensitivity of the reed switches. They can however be mounted so that their position can be adjusted.

The arrangement shown in FIG. 5 is virtually the same as that shown in FIG. 4 except that three reed switches 10A, 10B,10C are provided along the front edge of the platform 22. The arm 6A is pivoted at one end about pivot 6B and has two laterally spaced catches 6 at its other end. This platform is intended for use with a larger aperture designed to allow the passage therethrough of small dogs or large cats. When the reed switches 10A,10B or 10C are activated, the solenoid 5 draws the lever 6A downwardly against the action of the spring 25 thereby lowering the catches 6 below the periphery of the door 1 which can then swing inwardly to allow the passage of the animal through the aperture 17. Once the pet has passed through the aperture 17, the reed switches 10A,10B,10C will open again and the lever 6A is moved upwardly in the direction of arrow B by the action of the spring 25 to its normal rest position preventing further inward movement of the door.

In an alternative embodiment (not shown), a spring 25 is provided beneath each catch 6.

Figure 2:
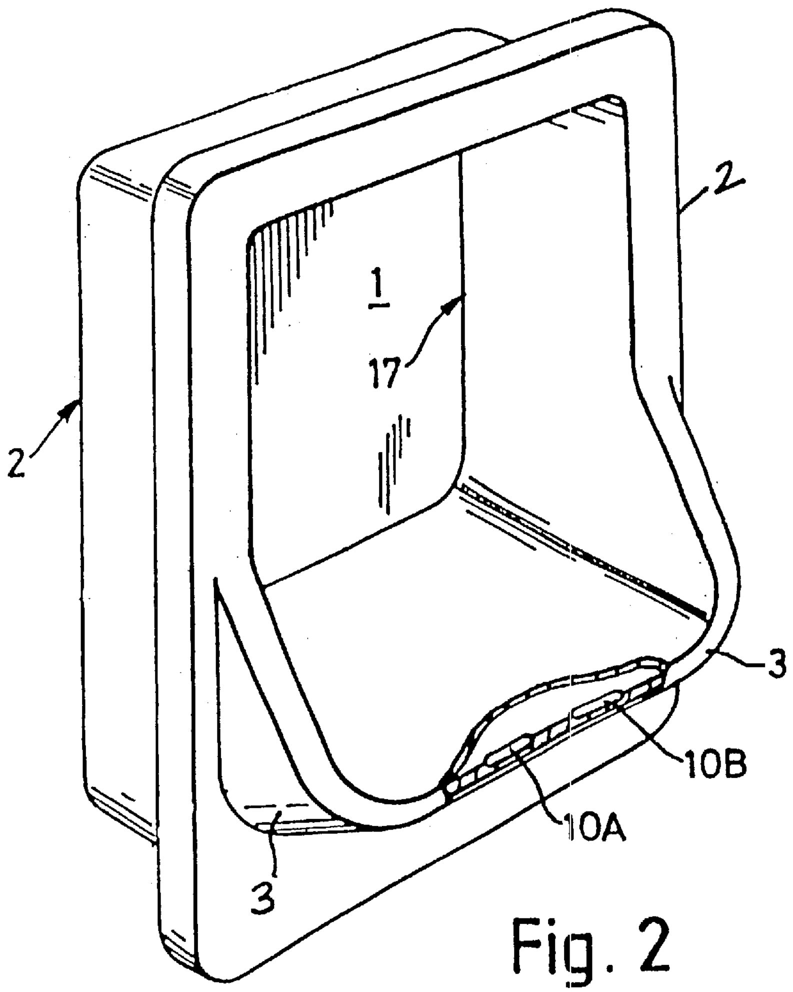
FIG. 2 is a perspective view of the frame of FIG. 1 with the door removed and partly broken away to show the location of the two reed switches.
Figure 3:
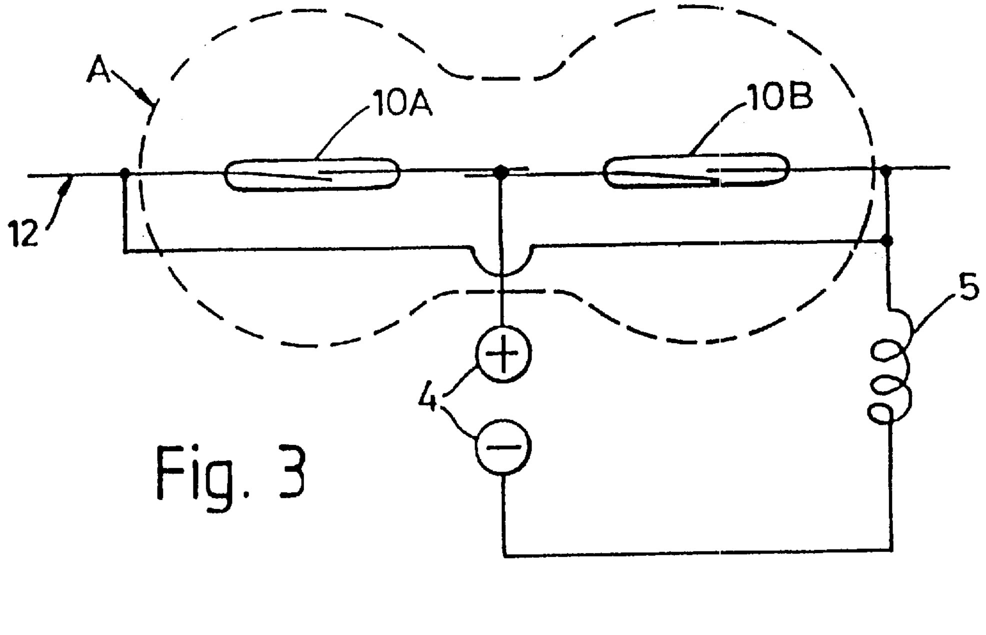
FIG. 3 is a circuit diagram of the electrical assembly.

The assemblies shown in FIGS. 4 and 5 are mounted in the frame 2 so that the platform 22 is located inside the extension 3 with the reed switches 10A,10B,10C closely adjacent the front edge of the extension 3 as shown in FIG. 1 or FIG. 2.

FIG. 6 shows the magnetic fields generated by a magnet 30 around the pet's neck, the magnetic fields generated by the biasing magnets 26 and 27 and the way in which these magnetic fields interact. It should be noted that it is important that the polarity of the magnets be arranged as illustrated otherwise the system will not work satisfactorily.

The axial displacement of the biasing magnets provides a magnetic flux that is easily controlled by the lateral displacement of said magnets. Furthermore, the position of the biasing magnets 26 and 27 is such that their magnetic field 31 is sufficient to influence and bias the reed switches 10A,10B but not so close that they cause the reed switches to remain latched after the pet has passed. (When correctly adjusted a 50% improvement in sensing distance is obtained). Accordingly, as soon as the magnet 30 carried by the pet passes through the frame 2 in the direction of arrow D, its magnetic field 32 will enter the detection zone A (see FIG. 1) which will upset the magnetic field 31 of the biasing magnets 26,27 thereby causing the reed switches 10A and 10B to close. This in turn activates the solenoid 5 which lowers the arm 6A and the catch 6 thereby allowing the door 1 to pivot inwardly of the frame passed the catch 6. Once the pet has passed through the frame 2, the magnet 30 around its neck ceases to have an affect on the reed switches 10A,10B so they open again thereby cutting off the electrical supply to the solenoid so it releases the arm 6A which is then moved upwardly to its rest position under the action of the spring 25. In this rest position, the catch 6 is once again positioned in the path of the door 1 so it cannot pivot inwardly.

What is claimed is:

1. An electro-magnetically controlled pet door comprising a door pivotally mounted in a door aperture in a frame, an electrically controlled catch mechanism normally preventing opening of the door in at least one direction that is released when the presence of a magnet carried by an animal approaching the door is sensed by a sensor comprising two or more reed switches on or in the frame connected electrically in parallel, said switches being disposed in an array extending circumferentially of said door aperture and having normally open contacts, the contacts of one or more of the switches closing in the presence of a magnet carried by an animal, wherein the pet door also includes magnetic field producing biasing means operable to increase the sensitivity of the reed switches to an animal borne magnet, said magnetic field producing biasing means comprises first and second magnets located beyond respective ends of the sensor and displaced transversely therefrom so as to produce a flux path extending along said sensor between the pole of the first magnet and the pole of the other magnet facing the sensor so that the contacts automatically open again when the presence of the magnet carried by the animal is no longer sensed by the reed switches.

2. A pet door as claimed in claim 1 wherein the sensor comprises a pair of reed switches and the magnetic biasing means comprises a pair of magnets, each positioned closely adjacent one of said reed switches, the ends of the magnets facing the reed switches being of opposite polarity.

3. A pet door as claimed in claim 1 wherein the sensor comprises two end reed switches on either side of a central reed switch, the magnetic biasing means comprising a pair of magnets each positioned closely adjacent one of said end reed switches, the ends of the magnets facing the reed switches being of opposite polarity.

4. A pet door as claimed in claim 1 wherein the reed switches are coaxially aligned and disposed in the frame with their common axis parallel with the plane of said aperture but spaced therefrom oppositely to said one direction.

5. A pet door as claimed in claim 1 wherein the reed switches are arranged on an arcuate axis.

6. A pet door as claimed in claim 1 wherein the reed switches are positioned in an outward extension of the lower surface of the frame in which the door pivots.

7. A pet door as claimed in claim 6 wherein the reed switches are mounted at the front of a platform which forms part of a chassis on which the catch mechanism is mounted, said platform extending within said outward extension of the lower surface of the frame.

8. A pet door as claimed in claim 1 wherein the catch mechanism is moved by a solenoid which is energised when the contacts of any of said reed switches are closed.

9. A pet door as claimed in claim 1 wherein the magnet carried by the pet is normally aligned in a preferred orientation relative to the biasing means when the pet approaches the door from the exterior thereof.

10. An electro-magnetically controlled pet door comprising:

a door frame with an aperture therein;

a door pivotally mounted in said door aperture;

a sensor comprising a plurality of parallel-connected reed switches having normally open contacts and arranged end-to-end transversely of said frame such that at least one reed switch will dose in the presence of a magnet carried by an animal approaching the door for passage therethrough;

magnetic field producing biasing means for increasing the sensitivity of said sensor to an animal-borne magnet; and an electrically controlled catch mechanism normally preventing opening of the door in at least one direction and released by the closing of any o said reed switches;

wherein the biasing means comprises first and second magnets located beyond respective ends of the sensor and displaced transversely therefrom so as to produce a flux path extending along said sensor between the pole of the first magnet and the pole of the other magnet facing the sensor.

* * * * *